A. C. SCOTT.
AVIATOR'S PARACHUTE AND PACK.
APPLICATION FILED NOV. 7, 1918.
1,378,382.
Patented May 17, 1921.
2 SHEETS—SHEET 1.
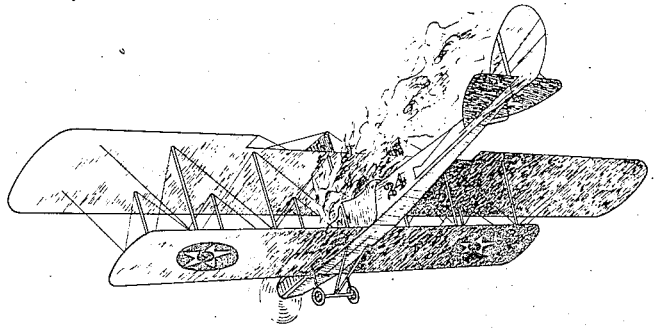
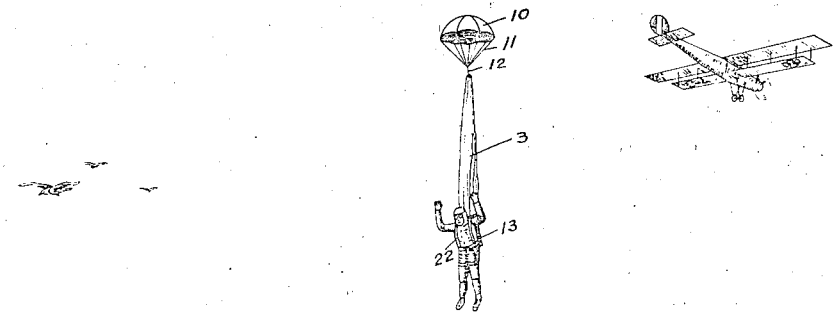
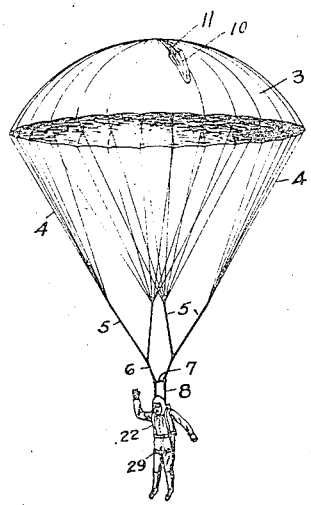
Inventor.
A. C. Scott,
By David O. Barnell.
Attorney.
Witness:
A. W. Jamieson.

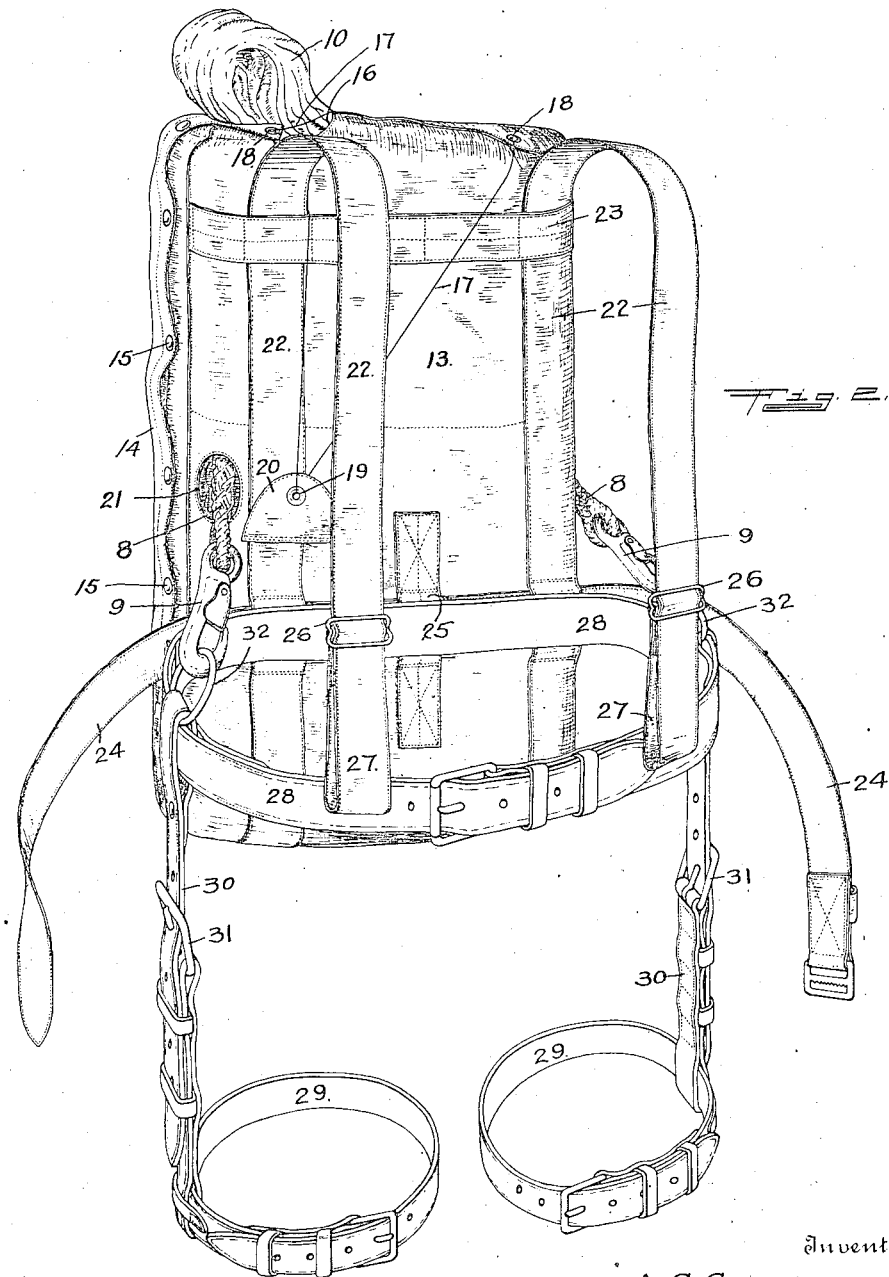

UNITED STATES PATENT OFFICE.

ALLEN C. SCOTT, OF OMAHA, NEBRASKA.

AVIATOR'S PARACHUTE AND PACK.

1,378,382.　　　　Specification of Letters Patent.　　Patented May 17, 1921.

Application filed November 7, 1918. Serial No. 261,730.

*To all whom it may concern:*

Be it known that I, ALLEN C. SCOTT, a citizen of the United States, and a resident of Omaha, in the county of Douglas and State of Nebraska, have invented certain new and useful Improvements in Aviators' Parachutes and Packs, of which the following is a specification.

My invention relates to safety appliances for aviators and aeronauts, and particularly to parachutes and packs therefor. It is the object of my invention to provide a parachute and pack adapted to be attached to and carried solely upon the body of the user, the device being entirely separate from and unattached to the airplane or balloon, so that when the aviator falls or jumps therefrom he may be entirely clear of the same before the opening of the parachute begins. Concurrently with the above stated object of my invention, is that of providing simple and effective means for releasing and withdrawing the parachute from the pack, so that prompt opening of the parachute may occur, the releasing being effected by action of the user at such time as he may choose, either before or after commencing his descent from the aircraft. Further and more specific objects of my invention will appear hereinafter.

In the accompanying drawings Figure 1 is a perspective view illustrating pictorially the use of apparatus embodying my invention, a parachute fully opened or extended being shown in one portion, and in another portion of the figure the main parachute being shown as unopened but partially withdrawn from the pack. Fig. 2 is a perspective view of the parachute pack provided by my invention, together with the harness or means for attaching the same to the body of the aviator.

In carrying out my invention I provide a main parachute which is substantially of the usual form and structure, and is of such size that when opened it will be capable of so checking or retarding the descent of the user as to enable a safe landing to be made at the conclusion of the fall. Preferably the main umbrella-shaped body 3 of the parachute is made of fabric such as silk, having great strength proportional to its weight and bulk. Said body 3 is constructed by sewing together the longitudinal edges of triangular sectors of the fabric, a small rope being inclosed in each of the seams, and said ropes being joined to a rope center-ring at the apices of the sectors. Portions 4 of said small ropes are continued from the outer edge of the main body 3, being formed into several groups, and the ends of each group are brought together and joined to a larger rope 5. The ends of the latter ropes are connected to a pair of ropes 6, and these are connected to each other by a cross-piece or trapeze 7 which is also preferably made of rope. Ropes 8 are connected with the ropes 6 at the ends of the trapeze, and the ends of said ropes 8 are provided with snap-hooks 9 for attachment to the safety-belt or harness worn by the aviator.

An auxiliary or secondary parachute is provided, of which the body 10 is much smaller than that of the main parachute, said body 10 being made of fabric similar to that of the body 3, but with fewer pieces or sectors. The ropes 11 from the edge of the body 10 are brought together and joined to a center-rope 12 which is fixedly connected with the center-ring at the apex of the main parachute.

Both the main parachute and the auxiliary parachute are normally contained in the pack shown in detail in Fig. 2. Said pack is made of fabric such as canvas and comprises an oblong and substantially rectangular body-portion 13, of which the rearward side 14 is in the form of a flap integrally connected with the body-portion at its lower end, and having its lateral edges detachably connected with the sides of the main body by snaps or glove-fasteners 15. Near one side, at the upper end of the pack, portions of the body and rear flap 14 are cut away to form an opening 16 through which a portion of the auxiliary parachute body 10 is arranged to protrude, as shown. The remainder of the upper end of the pack is normally held closed by means of a breakable cord or thread 17 attached to and passing through eyelets 18 on the flap 14 and through an eyelet 19 in a small flap 20 secured on the front of the main body 13. Near the sides of the body 13, intermediate the upper and lower ends thereof, openings 21 are provided, through which the ropes 8 are extended out of the pack. Fabric straps 22 are sewed to the front of the body 13 near the sides thereof, said straps extending from bottom to top of the pack, and being additionally secured near the top by a reinforcing cross-strap 23. Below the level of the openings 21 the straps 22 have portions which are not sewed to the body 13, whereby to form loops for receiving a belt 24, said belt being additionally connected with the pack by a short center-strap forming a loop 25, as shown. From the upper end of the pack free portions of the straps 22 are extended forwardly and downwardly, the ends of the free portions being provided with buckles 26 and being formed into loops 27, through which the ends of the belt 24 may be passed. When in use, the pack is held upon the back of the aviator, the straps 22 passing over the shoulders, the belt 24 being passed through the loops 27, and said belt buckled around the waist, the parts being so adjusted that the pack will be held upon the back of the wearer, like a knapsack, with the upper end of the pack at the level of the shoulders.

The safety belt or harness shown in Fig. 2 is of the usual form worn by military aeronauts, for connection with a parachute, and comprises a strong leather belt 28 adapted to be secured about the waist, a pair of smaller belts 29 adapted to be secured about the legs at the thighs, and straps 30 for connecting the leg-belts 29 with the waist-belt 28, said straps 30 being provided with buckles 31 for adjusting the length thereof, and metal rings 32 being held in the loops at the upper ends of the straps 30.

The arranging of the parachutes in the pack is readily effected after releasing the fasteners 15 and opening the rear flap 14 of the pack. The ends of the ropes 8, with the snaphooks 9 thereon, are first passed through the openings 21, and the ropes and body of the main parachute are then laid in the pack in a series of uniform folds, which may be kept apart by sheets of paper laid between them to prevent any possibility of entanglement of the ropes. Space is reserved at the top of the pack for the auxiliary small parachute, which is put in last, the flap 14 being secured at the sides by the fasteners 15, and the upper end of the pack being secured by the breakable cord or thread 17, a portion of the small parachute being arranged to protrude from the opening 16, as before mentioned.

When used by an aviator, the pack is placed at the back of his seat in the airplane, and forms a cushion therefor, the weight of the pack resting upon the seat, so as not to discommode the aviator in the least. The safety-belt device is adjusted upon the aviator prior to his entering the airplane, and, after taking his seat, the straps 22 of the pack are placed over the shoulders, the ends of the belt 24 passed through the loops 27, and said belt then buckled about the waist. The snap-hooks 9 are then engaged with the rings 32, after which the apparatus is ready for instant use.

Ordinarily, before jumping from the airplane, the aviator may grasp the protruding portion of the small parachute and pull the same from the pack by a single sweep of the arm, drawing said parachute forwardly over the shoulder and across the front of the body, said movement also serving to break the cord 17 which holds the top of the pack closed. Owing to the small size of the auxiliary parachute, which need not be much larger than an ordinary umbrella, the same may be completely withdrawn from the pack in the manner described, so as to be ready to open immediately upon commencing the descent. Upon opening of the auxiliary parachute, the pull thereof draws from the pack the main parachute, which then opens and retards the descent in the usual way. It may be noted that after opening of the main parachute, the same blankets the small parachute so that the latter becomes deflated and falls over onto the top of the main parachute, as shown in the lower portion of Fig. 1.

Should the aviator be accidentally thrown from the airplane, or should the situation be such that there would be a probability of the auxiliary parachute becoming entangled with the airplane if withdrawn from the pack prior to jumping, the releasing of the small parachute may be effected while the aviator is falling through the air. Obviously, by such procedure a longer fall will result before the descent is checked, and the same should not be attempted except at a height such that ample time will elapse for proper functioning of the main parachute before approaching the ground.

It will be apparent from the foregoing that my invention provides a simple and highly efficient safety device for aeronauts and aviators, particularly adapted for use by the latter in the event of burning or such vital disablement of an airplane as would preclude a reasonable probability of effecting a safe landing therein. It may be added that actual tests of the apparatus embodying the invention, made under official auspices, have shown it to be effective and dependable.

Now, having described my invention, what I claim and desire to secure by Letters Patent is:

1. An aviator's safety appliance, comprising a main parachute, means adapted to be secured upon the body of the aviator and to normally retain said parachute in folded form, and means for pulling said parachute from the retaining means, comprising a small auxiliary parachute attached to the main parachute and also normally held in folded form by the retaining means, said auxiliary parachute having a portion protruding from the retaining means and adapted to be grasped manually for withdrawal therefrom.

2. An aviator's safety appliance, comprising a pack adapted to be attached to and carried solely upon the body of the user, a main parachute and a small auxiliary parachute connected to each other and both normally inclosed in said pack, the auxiliary parachute adapted to be manually withdrawn from the pack and to exert, when opened during descent of the user, a pull upon the main parachute sufficient to withdraw the latter from the pack, and means controlled by the withdrawal of the auxiliary parachute for releasing and opening the pack.

3. A parachute pack adapted to contain a main parachute and an auxiliary parachute, and having openings for the passage of ropes from the main parachute and for protrusion of a portion of the auxiliary parachute, means for detachably securing said pack upon the body of an aviator, and a breakable closure arranged to be broken by withdrawal of the auxiliary parachute from the pack.

A. C. SCOTT.